US008870065B2

(12) United States Patent
Brennan

(10) Patent No.: US 8,870,065 B2
(45) Date of Patent: Oct. 28, 2014

(54) MULTI-USE ELECTRONIC CARD BALANCE READER

(75) Inventor: Sherry Brennan, San Rafael, CA (US)

(73) Assignee: Sherry Brennan, San Rafael, CA (US)

( * ) Notice: Subject to any disclaimer, the term of this patent is extended or adjusted under 35 U.S.C. 154(b) by 524 days.

(21) Appl. No.: 13/049,479

(22) Filed: Mar. 16, 2011

(65) Prior Publication Data

US 2011/0226852 A1 Sep. 22, 2011

Related U.S. Application Data

(60) Provisional application No. 61/314,383, filed on Mar. 16, 2010.

(51) Int. Cl.
*G07D 11/00* (2006.01)
*G06Q 20/40* (2012.01)
*G07F 7/08* (2006.01)

(52) U.S. Cl.
CPC .......... *G07F 1/1008* (2013.01); *G06Q 20/4033* (2013.01); *G07F 7/0826* (2013.01); *G07F 7/0873* (2013.01)
USPC ............................. 235/379; 235/487; 235/380

(58) Field of Classification Search
USPC ............ 235/375, 379, 492, 380, 487; 705/40, 705/41, 68
See application file for complete search history.

(56) References Cited

U.S. PATENT DOCUMENTS

| 4,868,376 | A | 9/1989 | Lessin et al. |
| 5,728,998 | A | 3/1998 | Novis et al. |
| 5,748,737 | A | 5/1998 | Daggar |
| 5,763,862 | A | 6/1998 | Jachimowicz et al. |
| 5,786,587 | A * | 7/1998 | Colgate, Jr. .................... 235/487 |
| 5,936,220 | A | 8/1999 | Hoshino et al. |
| 5,945,652 | A | 8/1999 | Ohki et al. |
| 5,987,438 | A | 11/1999 | Nakano et al. |
| 6,014,648 | A | 1/2000 | Brennan |
| 6,016,484 | A | 1/2000 | Williams et al. |
| 6,016,954 | A * | 1/2000 | Abe et al. ...................... 235/379 |
| 6,058,378 | A * | 5/2000 | Clark et al. ..................... 705/37 |
| 6,065,674 | A | 5/2000 | Shriver |
| 6,223,984 | B1 | 5/2001 | Renner et al. |
| 6,237,848 | B1 | 5/2001 | Everett |

(Continued)

OTHER PUBLICATIONS

New Credit Card Rules Create Opportunity for Prepaid Industry; Paymentssource.com, Feb. 25, 2010; 2 pages.

(Continued)

*Primary Examiner* — Sonji Johnson
(74) *Attorney, Agent, or Firm* — GTC Law Group LLP & Affiliates

(57) ABSTRACT

Devices for receiving a smart card, such as a debit card, and reading the card are disclosed. These devices allow a user, such as the holder of the smart card, to determine a balance available to the holder of the card or an account associated with the holder or the card. The portable card balance reader includes at least a microprocessor or microcontroller and sufficient memory for storing balances from the card and for performing calculations to alert a card holder that he or she may be spending an amount that is greater than an available amount from the account of the card holder. The portable card balance reader does not require connection to an external computer or the Internet. Information concerning balances for the account is input from the card itself, from the user, or from both the user and the card itself.

20 Claims, 5 Drawing Sheets

(56) References Cited

U.S. PATENT DOCUMENTS

| | | | |
|---|---|---|---|
| 6,595,413 | B1 | 7/2003 | Sugita |
| 6,678,753 | B1 | 1/2004 | Tanaka |
| 6,687,350 | B1 | 2/2004 | Landry et al. |
| 6,954,133 | B2 | 10/2005 | McGregor et al. |
| 7,043,493 | B2 | 5/2006 | Guthery |
| 7,677,457 | B2 | 3/2010 | Madej |
| 7,721,954 | B1* | 5/2010 | Karamian et al. ............ 235/380 |
| 7,726,566 | B2 | 6/2010 | Brown et al. |
| 7,766,243 | B2 | 8/2010 | Adams et al. |
| 7,784,687 | B2 | 8/2010 | Mullen et al. |
| 7,793,851 | B2 | 9/2010 | Mullen |
| 7,970,669 | B1* | 6/2011 | Santos ............................. 705/30 |
| 2005/0017068 | A1* | 1/2005 | Zalewski et al. .............. 235/380 |
| 2005/0078177 | A1* | 4/2005 | Gotanda ....................... 348/114 |
| 2006/0038004 | A1* | 2/2006 | Rielly et al. .................. 235/379 |
| 2006/0212393 | A1 | 9/2006 | Lindsay Brown |
| 2008/0033722 | A1* | 2/2008 | Beenau et al. ................ 704/246 |
| 2008/0223919 | A1* | 9/2008 | Shane et al. .................. 235/379 |
| 2009/0159663 | A1 | 6/2009 | Mullen et al. |
| 2009/0159681 | A1 | 6/2009 | Mullen et al. |
| 2009/0233640 | A1* | 9/2009 | Kurihara et al. ........... 455/550.1 |
| 2010/0059587 | A1* | 3/2010 | Miller et al. ................. 235/379 |
| 2010/0173678 | A1* | 7/2010 | Kim et al. ..................... 455/566 |

OTHER PUBLICATIONS

Eppicard glitch causes delays for benefits recipients; Christian Science Monitor at ChristianScienceMonitor.com, Sep. 7, 2010; 2 pages.

XIPWire Postings at xip.wire.com, Sep. 26, 2010; 5 pages.

Get it Right: Underbanked is Launching Mobile Payments, source unknown, Sep. 26, 2010; 1 page.

The good, bad and the ugly of credit card offers, posted on FoxBusiness.com, Sep. 23, 2010; 3 pages.

Discussion of Financial Service Innovations for the Underbanked/Underserved, posted on LinkenIn.com on Aug. 24, 2010; 3 pages.

For Chip Makers, the Next Battle is in Smartphones, The New York Times at nytimes.com, Feb. 22, 2010; 3 pages.

How Visa, Using Card Fees, Dominates a Market, The New York Times at nytimes.com, Jan. 5, 2010; 5 pages.

Untitled Article from paymentssource.com, re "Smaller Merchants can steer some of their transactions to debit networks," Jul. 28, 2010; 1 page.

Mobile Payment Opportunities and Hurdles Exist for ISOs, posted at paymentssource.com, Feb. 6, 2009; 4 pages.

Acculynk Forms Internet-PIN Debit Advisory Council, posted on paymentssource.com, Feb. 25, 2010; 2 pages.

Acculynk Extends Product Line, Develops ISO Reseller Program, posted on paymentssource.com, Apr. 8, 2010; 1 page.

Visa Adds Five Merchants to Business Card Savings Program, posted on paymentssource.com, Apr. 12, 2010; 1 page.

Sears is Back, Targeting the Underbanked, source unknown, May 14, 2010; 2 pages.

Retail Banking Innovation, from americanbanker@m.americanbanker.com, Apr. 29, 2010; 1 page.

Payroll Debit Cards Offer Enhanced Consumer Protection, www.americanpayroll.org, Mar. 2010; 2 pages.

The Fed's Responsibility, The New York Times at nytimes.com, Mar. 15, 2010; 1 page.

Citi Launches Shopping App, from paymentssource.com, Jun. 16, 2010, 2 pages.

Upside for Mobile Payments Comes Before the Payment, from paymentssource.com, May 25, 2010; 3 pages.

Financial Service Innovations for the Underbanked/Underserved, Discussion, source unknown, approx. Apr. 2010; 2 pages.

MasterCard to Open Its Software for Application Development, paymentssource.com, May 25, 2010; 1 page.

Why Android Is Attractive for Alt-Payment Companies, paymentssource.com, Jun. 4, 2010, 3 pages.

U.S. Bank Reveals Mobile Roadmap, paymentssource.com, Jun. 8, 2010; 2 pages.

Coming to your bank in 2010: New products and lots of fees, posted on walletpop.com, Jan. 6, 2010; 3 pages.

Our view on bank fees: How a cup of coffee can set you back an extra $34, USA Today at usatoday.com, Jun. 2008; 1 page.

A Surprise Mobile Banking Clientele: The Underbanked, from paymentssource.com, Aug. 24, 2010; 2 pages.

Hypercom Enters Smartphone Card-Reader Market, from paymentssource.com, Apr. 13, 2010; 1 page.

Visa to Test a System that Brings Payments to Phone, from paymentssource.com, Feb. 16, 2010; 2 pages.

First Data Taps MicroSD Cards as Next Contactless Step, from paymentssource.com, Mar. 16, 2010, 1 page.

PageOnce Windows Phone App Makes Personal Finance Portable, from mybanktracker.com, Oct. 11, 2010; 2 pages.

After you yap, try a credit card app, from creditcards.com, Feb. 2010; 4 pages.

The latest in sneaky credit card fees, from walletpop.com, Jul. 21, 2010; 2 pages.

USAA Offers Check Deposit by iPhone; An Ideal Option for Banks Lacking ATMs?, source unknown; 1 page.

Chase Beats Other Big Banks to Mobile Remote-Deposit Capture, from paymentssource.com, Jul. 6, 2010, 2 pages.

Examining Consumers and Technology: The 2010 US Benchmark Data Report, from blogs.forrester.com, Sep. 22, 2010, 2 pages.

How Should We Serve the Short-Term Credit Needs of Low-Income Consumers?, Joint Center for Housing Studies, Harvard University, by Melissa Koide and Rachel Schneider, Aug. 2010; 29 pages.

Quick Credit The Fringe Economy, the Great Recession, and the Welfare State, New America Foundation, by David Stoesz, Aug. 2010; 23 pages.

The Nonprofit's Guide to Prepaid Cards, from Center for Financial Services Innovation (CFSI), Sep. 2010; 42 pages.

Visa Europe says new CodeSure Card Will Reduce Card-Not-Present Fraud, from paymentssource.com, Jun. 2, 2010, 1 page.

Viewpoint: Draw on Old Lessons for a Quick Mobile Transition, from americanbanker.com, Sep. 24, 2010; 3 pages.

European Issuers Adding Display Screens to Cards, from americanbanker.com, Jun. 7, 2010; 2 pages.

Self Serve is Coming for the Underbanked, posted Sep. 28, 2010, Drew Edwards, 5 pages.

The Rise of the Cautious Consumer, Aug. 2010, Beth Robertson et al., from Javelin Strategy & Research, Pleasanton, CA, 10 pages.

"Payment Card Issuer Strategies 2010: The Rise of the Cautious Consumer", publicly available excerpt, Javelin Strategy & Research, Pleasanton, CA, www.javelinstrategy.com, 2010, 2 pages.

"WD 1 of ISO/IEC 18328-1 Identification Cards—Devices on Cards—Part 1: General Framework", Afnor Normalisation, Doc. No. N 2504, ISO/IEC JTC 1/SC 17/WG 4 Draft Standard, Dec. 20, 2012, 14 pages.

Collins, Jennifer , "A Short History of the Debit Card", http://www.marketplace.org/topics/business/news-brief/short-history-debit-card, Aug. 18, 2011, 3 pages.

Crosman, Penny , "Reaching the Underbanked? Try Offering Control, Research Says", American Banker, http://www.americanbanker.com, Mar. 6, 2013, 3 pages.

* cited by examiner

MULTI-USE ELECTRONIC CARD BALANCE READER

TECHNICAL FIELD

This application relates to the field of smart cards and more particularly to the field of devices used in conjunction with smart cards, such as smart card balance readers, to increase the usefulness of electronic cards to users.

BACKGROUND

A smart card is a plastic card with an embedded microchip that allows its owner to use, among other things, the smart card as a substitute for cash in purchasing a wide variety of goods and services. Smart cards are well known and have enjoyed wide commercial success, particularly in Europe and Asia, and are now becoming well known and widely accepted in the United States. Smart cards typically conform to ISO Standard 7816-4 from the International Standards Organization (ISO) and include an embedded internal microprocessor or microcontroller. At present, smart cards used in the financial sector take three forms: (1) a re-loadable, prepaid debit card that can be purchased at a variety of stores; (2) a debit card associated with a checking account at a bank; and (3) a typical credit card issued by a bank or a banking institution such as Discover®, Visa®, or Mastercard®.

One innovation of prepaid smart cards, or prepaid debit cards, is that they can be programmed to store a numerical value equaling the prepayment in cash by its owner and to deduct expenditures from the monetary value until the value is expended (i.e., zero balance is shown). The owner can then re-load the debit card by prepayment in cash and continue to use the same card. Thus, a prepaid debit card provides the convenience of a credit card, but does not require pre-qualification as to credit history, income, or the like. At any one time, a debit card can store a value of any monetary amount that has been credited to the user's card or user's checking account at a bank or banking institution. See The Non-Profit's Guide to Prepaid Cards, The Center for Financial Services Innovation, Chicago, Ill., September 2010. Further advantages of prepaid debit cards are that they eliminate the need to verify the ownership or the credit status and compliance of the user. A debit or credit card is typically activated by a personal PIN number to protect the owner from theft; thus, the particular smart card is of no value to anyone except the owner who possesses the PIN number.

A debit card associated with a checking account at a bank allows the card owner the convenience of the use of an electronic card in his or her daily purchases. The amount of money available to the owner is the amount found in the debit card owner's checking account. This kind of debit card is helpful to the card owner in that he or she is only able to spend existing funds, and this reduces the chance of future indebtedness. However, the debit card owner must be careful in its use, particularly when making multiple purchases in a short period of time because the bank will usually process the highest-priced purchase first, and if the checking account funds are insufficient, additional overdraft fees can be charged to each of the smaller purchases made during that particular short period of time. Assignment of overdraft fees may continue until the debit card owner becomes aware that a set of overdraft fees has further caused even more overdraft fees. To add to the problematic circumstances, if the debit card owner calls his or her bank requesting an account balance, the bank may provide any of three balances: a balance with pending transactions, an actual final balance (i.e., bank fees have been deducted for the month), or a balance showing available funds at the time of the call. Overdraft fees also occur with credit cards. A typical credit card issued by a bank or banking institution provides an infusion of money to the owner of the credit card, who then pays back the "loaned" money in monthly installments and at a specified rate of interest. Usually the monthly payment schedule is absolute, and if the credit card owner is late in paying the credit card company, the owner must pay an additional late fee.

A further characteristic of the prepaid debit card is that, as with cash transactions, no individual record of types of purchase is identified, allowing for the privacy of one's own transactions. Of course, if the debit card is linked to a financial institution, such as a bank, the bank keeps records of each transaction for later use by the card holder. Thus, the debit card provides the privacy of cash, but the safety and convenience of credit cards. In some countries, such as France, the smart card is a branded cash alternative for a wide range of goods and services, including telephone calls, highway tolls, retail store purchases, restaurant charges, taxicab charges, etc. In one sense, branded smart cards may be similar to prepaid debit cards, in the sense that the owner recognizes a limit to the utility of the card. In addition, if overcharges are allowed, the penalties or charges for going beyond the card limit may be onerous, especially for the unbanked, underbanked, or underserved users of such cards.

Unbanked people refers to people who conduct their financial lives entirely outside traditional banks and credit unions, while underbanked people are those who maintain a checking or savings account while also using alternative providers, such as payday loans. The credit needs of the unbanked and underbanked have been well documented. See, for example, How Should We Serve the Short-Term Credit Needs of Low-Income Consumers?, Melissa Koide and Rachel Schneider, Joint Center for Housing Studies, Harvard University, August, 2010 (MF10-2). See also, Quick Credit, The Fringe Economy, the Great Recession, and the Welfare State, David Stoez, New America Foundation, Washington, D.C., August 2010, for a discussion of the unbanked and underbanked. Smart cards, such as prepaid debit cards, at least allow these populations to pay bills and transact business with means other than cash. These populations can least afford overcharges and may benefit from increased use of financial smart cards and the new financial regulations at the federal level.

Increased financial regulations were enacted during the recession of 2008-2010, such as the Credit Card Accountability, Responsibility and Disclosure (Credit CARD) Act of 2009, the Durbin Amendment to the Dodd-Frank Bill, and Regulation E. In addition, a new Consumer Financial Protection Bureau is underway, and is expected to result in at least minimal re-regulation of the banking industry. This means increased protection for consumers. At least one practical result is that banks are already searching for ways to maximize their revenues while complying with the new regulations. See Payment Card Issuer Strategies 2010: The Rise of the Cautious Consumer, Javelin Strategy and Research, Pleasanton, Calif., U.S.A. (publicly available excerpt). Some financial institutions even charge for calls to customer service. Eppicard Glitch causes delays for benefits recipients, Christian Science Monitor, 9-26-2010, at http://www.csmonitor.com/layout/set/print/content/view/print/324206.

Sophisticated strategies from the banks may now focus on whether to allow overdrafts at all for their checking account, credit card, and debit card holders, and if so, how to comply with the new regulations and still continue a profitable revenue stream. For example, while credit cards have seen significant changes in the playing field, prepaid, re-loadable debit cards do not appear to have been affected by the new regulations. In addition, the popularity of such cards has grown dramatically, perhaps because they are easier to obtain and satisfactorily accommodate the day-to-day financial transaction needs of the average person. From a financial institution's point of view, the cards are especially popular: There is no extension of credit; and the balance that is prepaid is available to the financial institution until presentment from a merchant or other creditor.

As debit cards, especially pre-paid, re-loadable debit cards become even more popular, and as the penalties for overdrafts vary, consumers and holders of all such cards, including branded smart cards, will want better information about the state of their account balances, and in particular, up-to-the-minute information about the balance that is available. This information will help them to get the most use of their cards while avoiding overdraft fees and other penalties.

A consumer and financial smart card user needs to know precisely and to-the-minute the amount of a card balance that is available to him or her. These and other advantages of the invention, as well as additional inventive features, will be apparent from the description of the invention provided herein.

BRIEF SUMMARY OF THE INVENTION

One embodiment is a method for providing balances for an account accessed by an electronic card. The method includes steps of accessing the account with an electronic card, reading the electronic card with a card balance reader, recording a ledger balance of the account in a local memory of the card balance reader, recording an available funds balance of the account in a local memory of the card balance reader and optionally, recording a check register balance of the account in a local memory of the card balance reader. The method also includes steps of providing at least one display on the card balance reader for displaying at least one of the ledger balance, the available funds balance and the check register balance, and optionally a cushion amount, calculating with the card balance reader a minimum balance by comparing the ledger balance, the available funds balance and optionally the check register balance, and determining the minimum balance, and comparing the minimum balance with an amount of a desired expenditure.

Another embodiment is a method for providing balances for an account accessed by a smart card. The method includes steps of accessing the account at a financial institution with the smart card and reading the smart card with a portable card balance reader. The method also includes steps of recording a check register balance of the account in a local memory of the portable card balance reader, recording a ledger balance of the account in a local memory of the portable card balance reader, and recording an available funds balance of the account in a local memory of the portable card balance reader. The method also includes steps of providing at least one display on the portable card balance reader for displaying at least one of a cushion amount, the check register balance, the ledger balance and the available funds balance, calculating with the portable card balance reader a minimum balance by comparing the check register balance, the ledger balance and the available funds balance and determining the minimum balance, comparing the minimum balance with an amount of a desired expenditure, using the portable card balance reader, and displaying an alert if the desired expenditure is greater than the minimum balance.

Another embodiment is a portable card balance reader for an account at a financial institution accessed by an electronic card. The portable card balance reader includes a housing, an interface for an electronic card mounted to the housing, a microprocessor operably connected to the interface and having at least one memory sufficient for storing data and a computer software program, the microprocessor suitable for manipulating data in the memory, a manual entry device for entering data into the at least one memory, and at least one display operably connected to the microprocessor and at least one memory for displaying a cushion amount, a ledger balance, an available funds balance and optionally a check register balance, wherein the card balance reader is operable to record the ledger balance, the available funds balance, and optionally the check register balance, to compare the ledger balance, the available funds balance and optionally the check register balance, to determine a real time, actual balance.

Yet another embodiment is a portable card balance reader for an account at a financial institution accessed by an electronic card. The portable card balance reader includes a housing, an interface for the electronic card, wherein the portable card balance reader has no interface suitable for directly accessing an Internet or a computer, and a microprocessor operably connected to the interface and having at least one memory sufficient for storing data and a computer software program, the processor suitable for manipulating data in the memory. The portable card balance reader also includes a key pad for entering data into the at least one memory and at least one numeric display operably connected to the microprocessor and the at least one memory for displaying a cushion amount, a check register balance, a ledger balance and an available funds balance, wherein the card balance reader is operable to record the check register balance, the ledger balance and the available funds balance, to compare the check register balance, the ledger balance and the available funds balance, to determine an actual minimum balance comprising the lowest balance if the check register balance, the ledger balance and the available funds balance, and to display an alert if an amount of a contemplated purchase exceeds the minimum balance.

Other embodiments and advantages will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. The drawings are meant to be illustrative rather than limiting. In the drawings.

Figure 1:
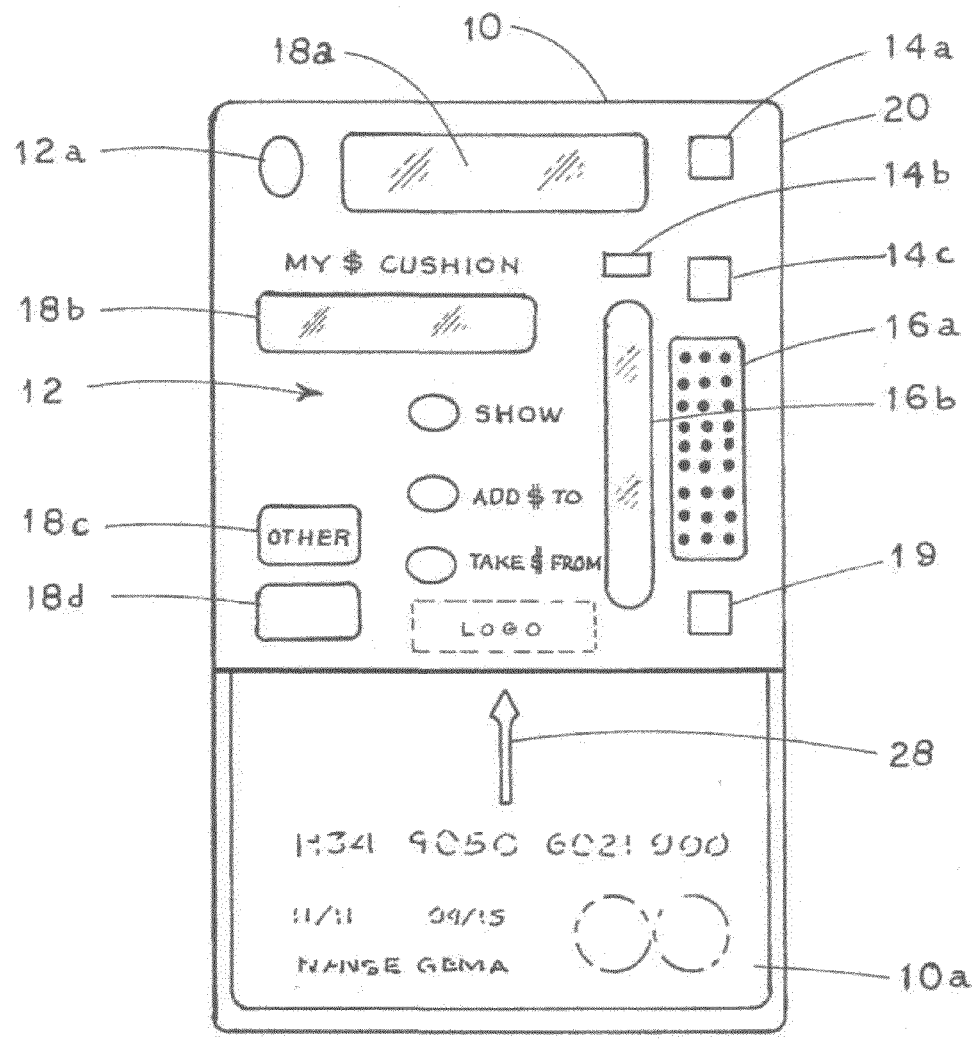
FIG. 1 depicts a front view of a first embodiment.

While the invention will be described in connection with certain preferred embodiments, there is no intent to limit it to those embodiments. The intent is to cover all alternatives, modifications, and equivalents as included within the spirit and scope of the invention as defined by the appended claims.

DETAILED DESCRIPTION

Smart cards continue the trend of non-cash transactions that include the use of notes, early paper money, checks, and debit and credit cards. Each of these innovations arose because it is inconvenient and may be unsafe to carry sufficient specie or cash for one's needs for a long period of time or while traveling. While each of these has advantages over cash, each also has a disadvantage. For debit, credit, and other smart cards, one disadvantage is that it may be difficult to know precisely the balance that is available to the user at any given moment in time.

Each of these cards is typically linked to an account at a financial institution, such as a bank, a savings and loan association or a loan company. In one sense, the balance in the account is the amount that is or should be available to the user. However, there are a variety of procedures and transactions that make the available balance, that is, the funds available balance, different from an amount that the user or consumer believes should be available. For example, a deposit into an account for a debit card may not made fully available, i.e., credited to the funds available balance of the account, until several days or even later.

In another example, debit cards are used not merely for transactions, but by certain vendors, such as hotels or rental agencies, to insure the availability of funds for contemplated transactions. Such vendors may place "holds" or debits that are unpredictable both in terms of the amount and the time extent of the hold. These holds also have the effect of reducing the funds available to the user of the card.

In another example, more apropos for credit transactions, payments by the user may not be credited to the account as quickly as the cardholder believes is appropriate. Credit cards are also subject to the same "holds" discussed above for debit card holders. The effect of these variances is to reduce the amount of credit or funds available to the user.

As noted above, a debit card user may be subject to fees and penalties when the transactions of the user exceed the available balance, just as a person whose checks exceed the balance available when the checks are presented to the bank. Credit card users may be subject to fees and penalties when they exceed their credit limit, which may also be considered an available balance. Of course, banks or other financial institutions are not obligated to honor transactions that exceed the user or customer's available balance: The transactions may be declined. While this may be embarrassing for the user, it also creates difficulties for the bank or other financial institution, because the result may be reduced fees and income, as well as customer attrition.

It is thus in the interest of both users and financial institutions for the customers to know the amount of funds, or balance available, before a purchase. This information may be provided by the portable card balance readers and methods disclosed herein.

It may be useful to explain several terms used in this disclosure. The available funds balance is the amount of the user's deposited funds less any amounts withheld by the institution awaiting clearance, and less any amounts which are on "hold" by creditors. The ledger balance is the amount of the user's deposited funds less any amounts which are on "hold" by creditors. The check register balance is the amount that would be in the account if the user were recording in real time every completed transaction, both deposits and expenditures, without regard to "holds" or other temporary variances. A padding amount or cushion amount is an additional amount that the user may or may not apply to any or all of the above balances, but which the user wishes to remain in the account at all times as a margin of safety against overdrafts or declines.

Each of these balances has a flaw in predicting the balance available to the user. The check register balance does not account for merchant or clearance holds, but does account for the very latest transactions (purchases). The ledger balance accounts for merchant "holds" but may not account for clearance holds. The available funds balance may account for both types of holds but may not account for the very latest purchases. In order to determine the balance available for purchases, a minimum balance, it would be advantageous if the user could compare these amounts before a next contemplated purchase. Then the user would know whether there is a sufficient balance in the account, or within the credit limit, to complete the purchase or transaction.

In order to do this, the financial smart card user would need to access the card, and through the card access his or her account, before the purchase. The present disclosure shows how this may be accomplished, thus allowing the user to stay within his or her account or credit limits. In this way, there is little opportunity for the financial institution to apply the charges that threaten the financial well-being of the user.

One embodiment of a smart card balance reader is depicted in FIG. 1. Smart card balance reader 10 with housing 20 is shown with a typical smart card 10a being inserted into the housing and a card interface 28 (external portion only shown) of the reader. The housing may be made of plastic, such as a flexible plastic envelope of which portions are suitable for mounting and housing the many electrical components discussed herein. The reader is compact and is sized about the same order of magnitude as the cards which it reads, or a little larger, as shown. The card is thus convenient to carry in a pocket, purse, or backpack of the user. This embodiment of the smart card balance reader includes several function keys, 12, 12a, allowing the user to issue commands to the card balance reader. The function keys may be inputs to the microprocessor or microcontroller of the balance reader. Another function key is 18c, which may be used for other functions of the balance reader. This would include use for putting aside an additional sum of money for a particular reason or occasion in any given month.

In this embodiment, function key 12a commands the reader to show the account balance, which may be one or more of the balances discussed above. Function keys 12 include keys for "show" (display), "add money to" and "take money from," an account. The amount or amounts will be displayed on reader display 18a or cushion display 18b, which may be outputs from the microprocessor or microcontroller. As noted, the cushion amount is a certain sum of money which has been deposited into the account but which is not shown as part of the balance in the account. The user maintains the cushion amount to avoid exceeding a credit or debit limit. Another small display on the balance reader, display 18d, is used for displaying the calendar date and for the time of day, when the balance reader is turned on. The displays discussed herein are primarily numerical displays, i.e., similar to a calculator display for showing numbers. At least some of the displays may also be full alpha-numeric displays, enabling a user to read brief messages, such as warnings or messages from help screens, as discussed below.

Other features of the balance reader include an on/off key 14a, and additional optional on/off keys 14b, 14c for speaker 16a and light alert 16b. On/off keys 14b, 14c are defaulted to on when the user turns on/off key 14a on. The speaker and light are used to warn the user when a contemplated purchase or expenditure may exceed the balance in the account, or when it would exceed the credit/debit limit. For example, a red light may illuminate, or an LED may flash when the limit is about to be exceeded. Alternatively, a warning tone or sound may be emitted from the speaker.

Depending on the amount of the overcharge, there may be milder or more active warnings. For example, if it is merely possible that under certain circumstances the account balance may be exceeded, an amber light may flash or a mild warning may be issued, such as "Warning! This purchase may cause an overcharge." Under other circumstances, when the contemplated expenditure will definitely cause an overage, a red light may flash or a more urgent warning may sound, such as, "Warning! This purchase will exceed your account balance!"

In one embodiment, the main screen 18a is used to display the account balance. As noted above, the actual amount displayed may be one of, for example, an available funds balance or a ledger balance. Function key 12a may be used to manipulate which balance, if any, is displayed, by repeated activation of key 12a. When the card balance reader displays the correct balance, the additional function keys 12 may be used in conjunction with the secondary screen 18b.

In one embodiment, secondary screen 18b may be used to show the amount of cushion in the account when the show key is depressed. Using the other function keys, the user may add to the cushion or remove money from the cushion. The amount may be entered via a key pad that is part of the balance reader or the amount may be in set increments, such as $5 or $10 per activation of the "add $ to" or "take $ from" keys. These functions provide a ready and convenient way for the user to manage a cushion, or safety margin, in the account.

The balance reader may also include a "Help" button 19. The "Help" screens are intended to heavily assist the non-technical user in understanding and utilizing the many functions of the Card Balance Reader discussed herein. The Card Balance Reader may also be known as the RED HOT!! Card Balance Reader.

A Help screen appears when the out-of-box device is first turned on, and thereafter, Help screens may be called up when the user presses the Help button 19. The first Help screen may use the main display 18a. The screen may show, "For help in English, press the Help button 1 time. For Help in Spanish, press the Help button 2 times." The display may alternate in English or Spanish, or other desired language, until the user presses the Help button once or twice. Once the language is selected, the balance reader screen may then suggest specific menus, such as, "For help to set up My RED HOT!! Card Balance Reader only, press the Help button 1 time. For help to set up the Wings, press the Help button 2 times," and so forth. Help also may be offered on several other specific tasks.

The Help screens may then continue to those specific tasks, such as setting up the "cushion" or cushion amount, changing the cushion amount, and so forth. The Help screen may also have a special "return to main menu" or "return to start" option. This option could take the form of, "If you wish to escape a screen and return to start or exit, press "#" key 2 times at any point." The screen will then ask the user whether he or she wishes to exit, and if so, instructs the user to press another key. This feature may help a user to avoid frustration in what may be the user's first time programming an electronic device. Other features may also be used as part of the help function.

Figure 2:
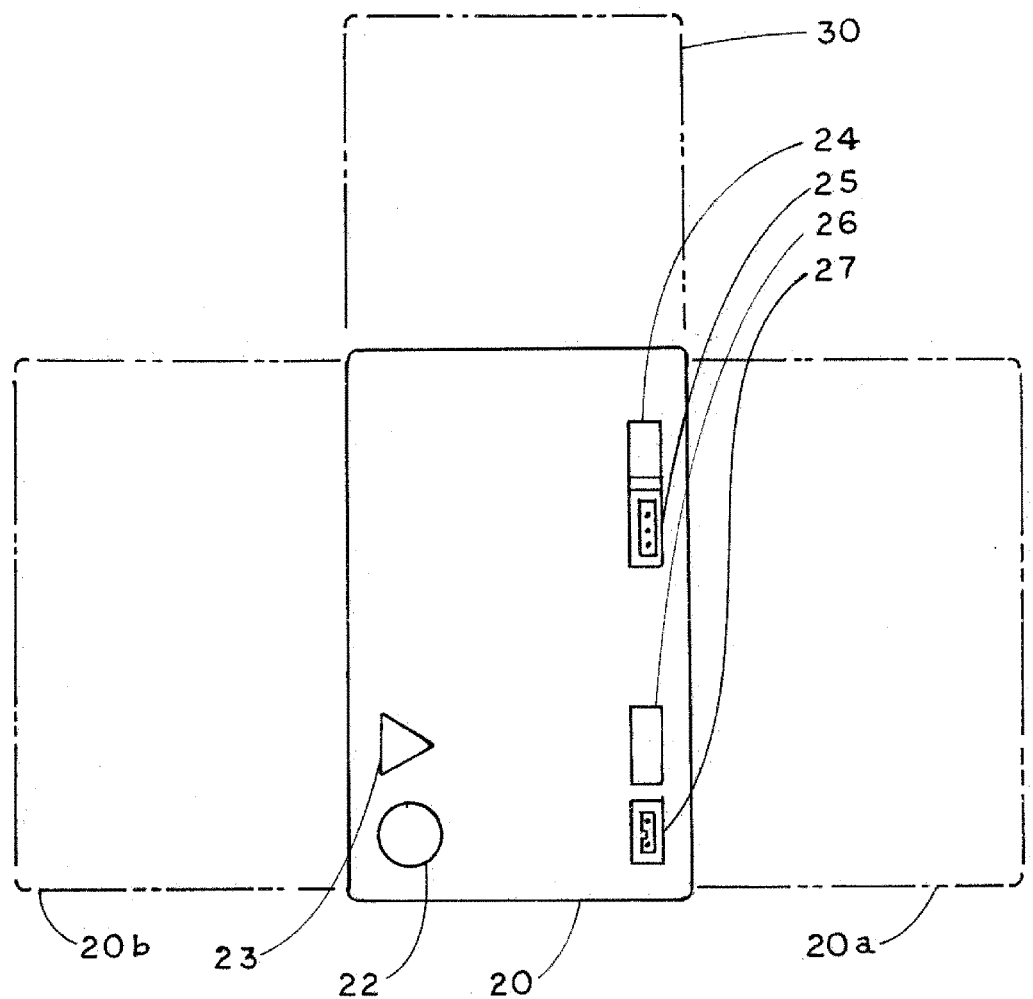
FIG. 2 depicts a back view of the embodiment of FIG. 1.

The rear of the balance reader 10 is depicted in FIG. 2. The rear portion of the housing 20 includes several interfaces or connections, as seen. In addition, the card balance reader has a left wing 20a, a right wing 20b and a slidable calculator 30. The calculator 30 typically resides behind the front panel and may be slid up for use, as will be seen below in FIGS. 3 and 4. Making the calculator slidable also makes the balance reader more compact (practically the size of the card itself) and easier to carry and use.

Housing 20 may be manufactured from plastic, with flexible hinges allowing wings 20a, 20b to fold behind the center portion of the housing. Suitable plastics may include urethanes, polyethylene, polypropylene, ABS, and so forth, and combinations. For example, flexible polypropylene hinges may connect urethane or polyethylene wings and a central housing. The wings may include mounted electrical components, at least including function keys, as seen below in FIG. 3. The central portion itself may be stiffer, so as to include side rails (not shown) for the slidable calculator 30. The calculator may reside in a stiff plastic housing attached to the side rails.

Seen from the rear, the balance reader has useful interfaces or connections. These include a battery door 22 and a smart phone physical interface 23. A special key 24 may be used for security purposes. For example, pressing key 24 may invoke a special procedure for entering a password, a personal identification number (PIN) or other access code. This may be to allow access to the functions of the balance reader, or could allow access to other functions, such as to outside connections, e.g., a computer, an Internet, and so forth. Interface 25 may be a connection suitable for a computer, e.g., a USB or mini-USB connection. In one embodiment, there may also be an extra date/time display 26, on the rear of the balance reader. Some embodiments may also include a power connector 27 for recharging the battery for smart card embodiments with recharging circuitry and a rechargeable battery.

Figure 3:
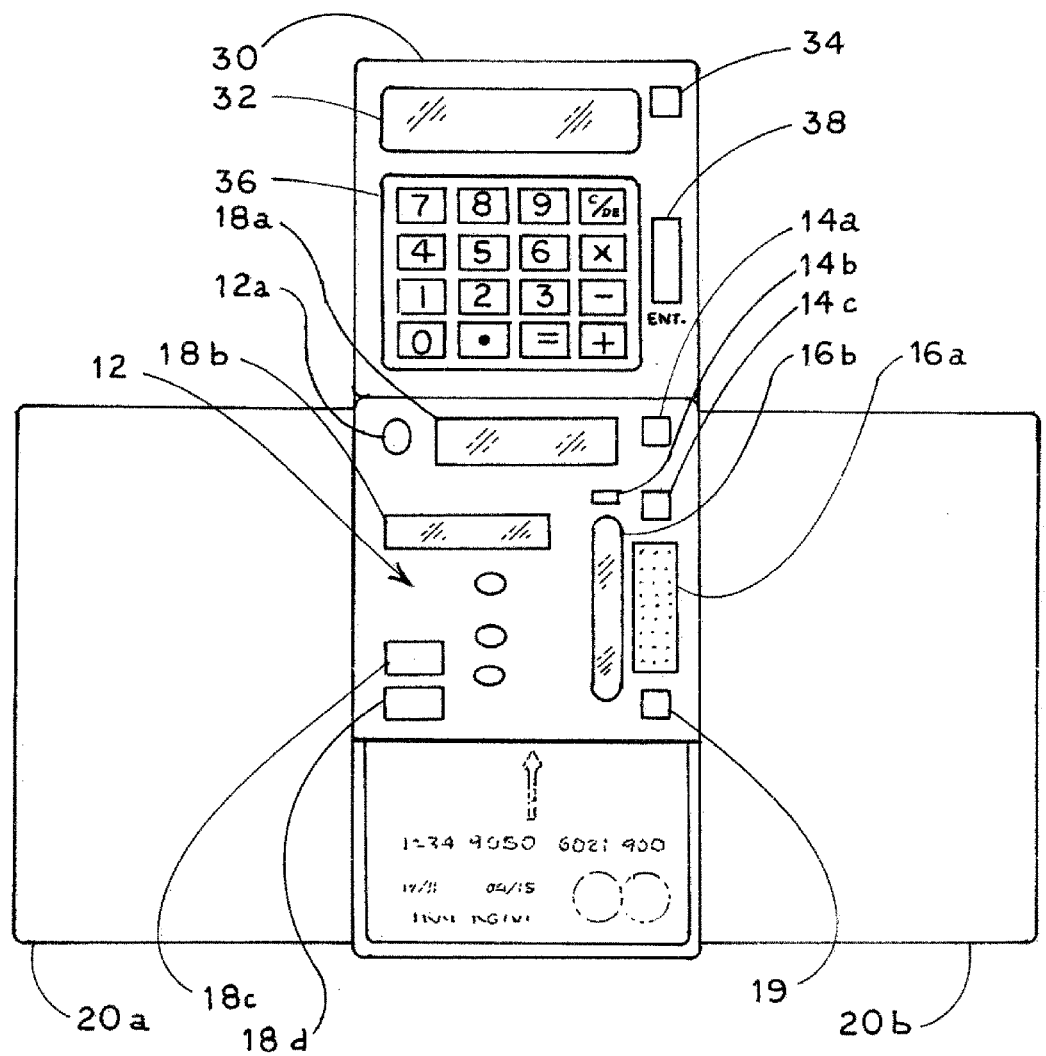
FIG. 3 depicts another view of the embodiment of FIG. 1.

The slidable calculator 30, as seen in FIG. 3, is the principal means by which data is entered and by which numerical manipulation of data occurs. As seen in FIG. 3, from the front of the card balance reader, calculator 30, slidable up and down behind the front of the balance reader, is in the up position, allowing the user to see the calculator and to manipulate all calculator functions. Calculator 30 includes a display screen 32, an on/off switch 34, keyboard 36 and an enter key 38, in addition to other normal calculator keys. In this view and in this embodiment, left wing 20a and right wing 20b function primarily as a further housing for the balance reader. The card balance reader includes many features discussed above, including function keys 12, 12a, displays 18a-18d, on/off switches 14a-14c, alerts/alarms 16a, 16b, and Help button 19.

When entering amounts, and manipulating data, the user will typically turn on the card balance reader and the calculator. The calculator and its screen are used to enter data, such as amounts, according to the various function keys. For example, if one wishes to see the amount of the present cushion in the account, one would press the "show" function key, to display the current cushion in the "my cushion" screen 18b. If one then wishes to add money or take money from the cushion, the appropriate function key is entered. This activates the calculator to expect a data entry, that is, an amount of money to add to or take from the cushion. The amount is entered using the normal calculator key pad. When the enter key of the calculator is depressed, the transaction is carried out, and the amount indicated is added to or subtracted from the cushion. This new cushion amount is then used for any subsequent transaction or calculation.

The calculator and its keys are used for entering and manipulating data for virtually all transactions visualized for the card balance reader. To continue the present example, an account balance may be entered using the calculator key pad. When the correct amount appears in the calculator display, depressing the calculator "enter" key then changes the appropriate account balance.

The device may be used to read a balance from any electronic card that carries a cash balance. Thus, the device may be used as a card balance reader whose only function is to read a balance. The user may use the device for more than one electronic card. For example, the user may have two or more smart cards and wish to get an overview of his or her balances across all cards. This can be done by simply placing each card into the device in turn, and allowing the card balance reader to display the balance for each card in turn. For the user who has a primary card used most often, several other functions are available.

Function key 12a may be used to indicate the particular balance. For example, the default balance for display 18a may be the ledger balance at the financial institution. When the user turns on the balance reader and inserts the card, display 18a may indicate a balance in numerals (digits) and may indicate which balance by additional characters indicating "LB," "ledger balance," or the like. Depressing function key 12a once may change the display to the available funds balance, which is indicated by additional characters indicating "AF," "available funds," or the like. Depressing function key 12a twice may change the display to a check register balance. The screen may then display the check register balance along with additional characters to indicate which balance, such as "CR" or "check register," or similar.

By the same token, when the user is initializing the card balance reader, or changing data on the balance reader, function key 12a and the calculator are used. For example, if the user has recently balanced his or her checkbook and is ready to enter a new "check book amount" or "check register amount," function key 12a would be depressed twice, or until "CR" appears. This alerts the calculator, which has already been activated, to expect an entry for a check register amount. The amount is entered using the calculator key pad and the calculator display. When the calculator "enter" key is depressed, the check register amount is changed for all subsequent calculations.

Figure 4:
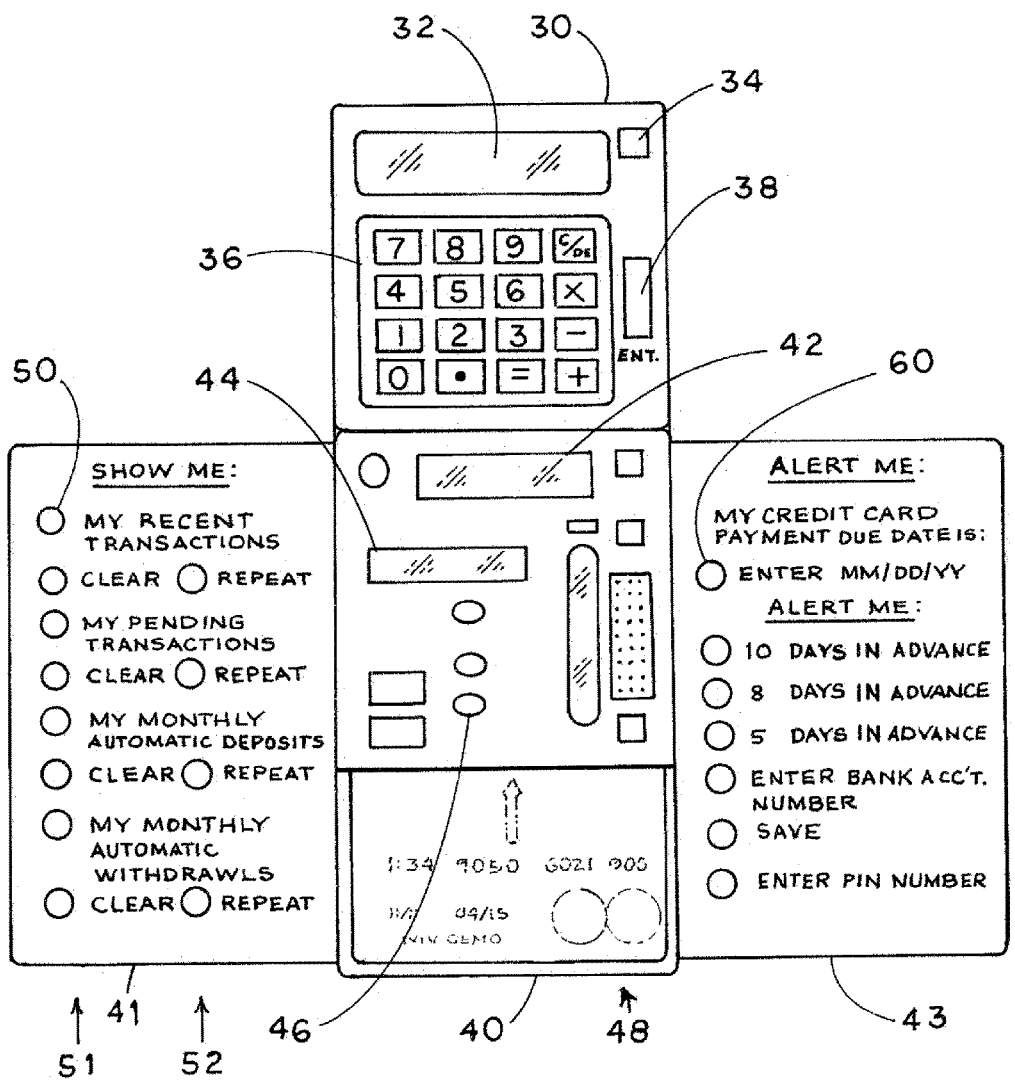
FIG. 4 depicts a second embodiment.

In other embodiments, a balance reader 40 may have additional functions, as shown in FIG. 4. In this embodiment, left wing 20a includes several function keys 50 which allow the user to display desired information. In addition to the function keys, each requested function also has additional function keys 51, 52 respectively, for clearing (cancelling) or repeating the functions. Right wing 20b includes function keys 60 which allow the user to instruct the balance reader for various reminders.

The RED HOT!! Card balance reader 40 includes several features already discussed, such as principal display 42, secondary display 44, function keys 46, and other features, such as on/off keys, alerts/alarms and smart card interface 48 (external portion only shown). Card balance reader 40 also includes a slidable calculator 30 with calculator display 32, on/off key 34, keypad 36 and enters key 38. The card balance reader and the calculator in this embodiment function in the same general manner discussed for other embodiments. That is, the functions keys initiate and alert the card balance reader and the calculator to the task at hand. These function keys, or specific tasks, initiate an intent to manipulate data. Once data has been entered using the calculator, the user depresses the calculator enter key to manipulate the data, carry out the calculation, or effect the change requested.

For example, in FIG. 4, the left wing 41 function keys 50 allow the user to easily instruct the card balance reader to show one or more of the following: recent transactions; pending transactions; automatic monthly (or other time period) deposits; automatic monthly (or other time period) withdrawals. If the user decides that he or she does not need to see the information, or is through viewing the information, he or she may depress the appropriate "clear" function key to clear the display. If the user wishes to update the display, he or she need only depress the appropriate "repeat" key to refresh or repeat the information. Note that this information, and other information discussed in this disclosure, will previously have been stored in the memory of the smart card. This memory may be permanent memory, such as a read-only memory, of the card balance reader. The information may be refreshed or updated by accessing the user's account. This may be accomplished at a terminal of the bank or other financial institution, by an ATM (automated teller machine) with access to the user's account, or even by a point-of-sale terminal at a merchant or other retailer.

Another series of convenient function keys 60 is displayed on the right wing 43. Function keys 60 primarily allow the user to prepare alerts. When the noted condition occurs, the balance reader controller will send a signal to one or more lights or speakers on the card, such as the alerts/alarms discussed above. For example, the user may wish to be alerted when a credit card payment or the cell phone bill is due. The user may wish for the reminder a set number of days in advance.

To set such a reminder, the user activates the function key nearest the "enter MM/DD/YY" entry. By depressing the function key, the user alerts the balance reader to expect entry of the date into the calculator using the calculator key pad, while the date entered is automatically displayed in the calculator display. After this has been accomplished, the user may then select to be alerted 10, 8 or 5 days in advance by depressing the appropriate function key.

The balance reader will then automatically turn itself on at an agreed-upon time on the appropriate date. The balance reader will alert the owner by sending a signal to activate a flashing light or a speaker on the balance reader. The alert may be active for a few minutes, during which time the user is expected to turn the one or more alerts off. If the user does not manually turn the alert off, the alert may repeat at intervals throughout the day, such as every hour or two, until the acknowledgement signal is given. In some embodiments, merely one or a set number of warnings may be given, rather than repeating until acknowledgement.

The function keys may be used for a number of other convenient purposes. As shown in FIG. 4, a bank account number function key may be provided, allowing a user to change the accounts accessed, or to review data from more than one account. A security function key may also be used. When the PIN number function key is depressed, the user is expected to enter the appropriate PIN or access code allowing the user access to the information stored in the card balance reader. Other function keys may also be provided, such as an acknowledgement key.

Figure 5:
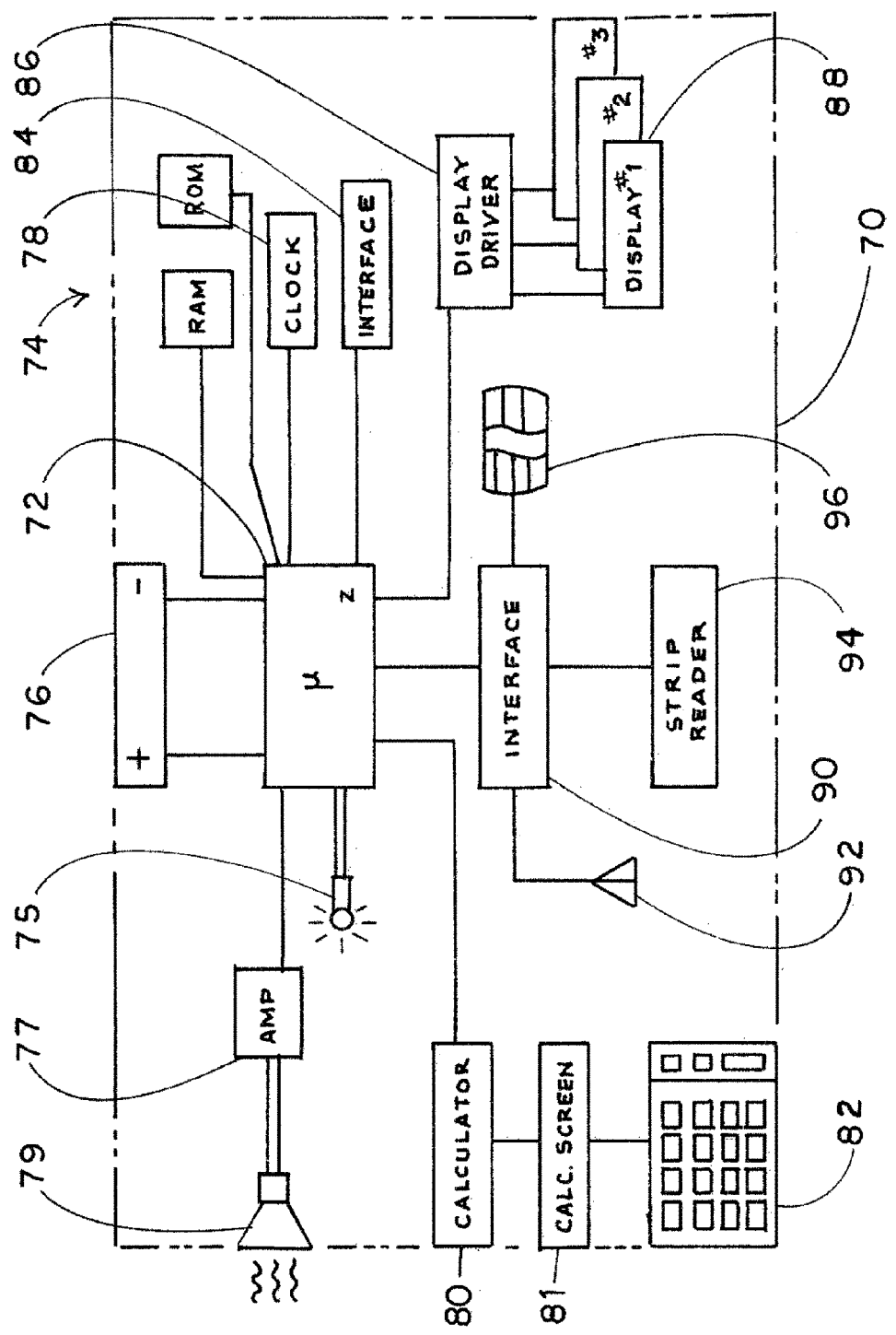
FIG. 5 depicts a circuit diagram of an embodiment.

An exemplary diagram outlining the components for a smart card balance reader is depicted in FIG. 5. The smart card balance reader circuit 70 includes a microprocessor or microcontroller 72, operably connected to at least one memory chip 74, such as random access memory (RAM) or a read-only memory (ROM), a permanent memory. The ROM will record the functions performed on the smart card balance reader. It is understood that the smart card requires a computer program to operate as described herein. The computer program will contain the appropriate instructions required to interpret all user inputs and actions. These include instructions for interpreting calculator entries, commands entered via the function keys, and so forth.

The smart card balance reader will require a power source, such as battery 76. The battery may be rechargeable or may simply be replaceable. An oscillator circuit or clock 78 is also included. The calculator 80 discussed above, complete with a display screen 81 and keypad 82 is operably connected to the microprocessor or microcontroller. The calculator may also include its own battery or power supply (not shown). The circuit includes a display driver 86 to control the displays 88 needed for the smart card balance reader.

The smart card balance reader also includes one or more interfaces 84 for allowing the user to interact with the device. As noted above, numerous function keys enable the user to instruct the smart card balance reader to accomplish a variety of actions and calculations. Each of these function keys is in reality an interface, connected to an input to the microcontroller or microprocessor. In addition, numerous other interfaces have been discussed above, such as a USB connector or a mini-USB connector for allowing the smart card balance reader to interface with other devices, such as a computer, smart phone or a cell phone. Each of these devices is depicted schematically as interface 84.

In addition, the smart card balance reader includes one or more lights 75, such as a red light or amber light for continuous illumination or for intermittent flashing. Light 75 may comprise an LED or other suitable lamp. There may also be a speaker 79 for making a sound or otherwise alerting the user. Speaker 79 may be driven by a speaker amplifier 77 connected to the microprocessor or microcontroller 72 and a suitable power supply, such as battery 76.

The smart card balance reader also includes an interface 90 for the smart card. Each smart card balance reader may have a single interface or may have more than one interface. The smart card balance reader may interface to a smart card in a non-contact manner with radio frequency identification (RFID) antenna 92 for smart cards equipped with RFID circuitry and their own internal antenna. Contact interfaces that may be used include magnetic strip reader 94 and smart card contact pad 96, for use with smart cards having a magnetic strip or a corresponding contact pad interface. Other smart card balance readers will have an interface suitable for smart cards with different interface circuitry.

When the user wishes to make a purchase or pay a bill, the user may take the smart card and insert it into the smart card balance reader. When the reader is activated, the user may accept the last-entered balances to calculate whether there is a sufficient balance to make a purchase. The user may instead update the reader balances, for example, by entering a check register balance that reflects the latest balance based on his or her purchases. For a debit card, this may be the amount the user has calculated by subtracting all purchases and expenditures from the last known balance. Note that the balance reader includes a power supply and sufficient memory to record balances each time the account is accessed. Each time a purchase or expenditure is made, the smart card reader balances may be updated.

For the balances from the financial institution or other establishment issuing the smart card, the user may depend on the last balances entered into the card and the balance reader, for example from the last purchase or transaction with the card, by entering the card into the card balance reader. Note that a smart card typically will carry in its memory at least one of the ledger balance and the funds available balance. Thus, the last-recorded sums for these balances may be obtained simply by inserting the smart card into the smart card balance reader.

Alternatively, the user may update the smart card's balances by entering the smart card into a suitable terminal to access his or her account at the financial institution or other establishment. This may be accomplished at a retailer's point-of-sale terminal. Access may instead be gained by using other suitable terminals, such as an automatic teller machine (ATM) from a participating or cooperating financial institution. A growing number of smart phones are now able to access the bank accounts of their owners. For example, some smart phones include a chip, such as a MicroSD (secure digital) card, that allows the smart phone to act as a smart card for purchasing goods and services, using near field communication (NFC) technology. For those with a suitable interface, such as an RFID antenna, the balances on the card, which is now part of a smart phone, may be read by the balance reader disclosed herein.

By accessing the account, the smart card is updated with at least one of a ledger balance and an available funds balance. That is, these balances are stored in the memory of the smart card and are available for manipulation, calculation and display on the displays of the card balance reader when the smart card is inserted into the card balance reader. The user may optionally enter data on checks written, debits allowed and deposits made to calculate a "check register" balance to assist in determining the allowable amount of a contemplated next purchase or expenditure.

Thus, after the initial use, the smart card memory may include a check register balance, a ledger balance, and a funds available balance. These data may be updated, or, if no transactions have occurred, the next proposed purchase or expenditure may be evaluated without entering additional data or without newly accessing the user's account at a financial or other institution. By adhering to this practice, a card holder may avoid exceeding his or her account balance or credit limit, and thus avoid onerous overcharges.

If the smart card is lost, or if the RED HOT!! Card Balance Reader is lost, the user may report the loss to his or her financial institution. The account may be frozen. If the smart card or the card balance reader is equipped with remote communications, such as RFID, the card or the reader may be remotely deactivated. In either case, an unauthorized person will be unable to use the card or the reader.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device operable to execute program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions operable to be executed by the computing or processing device may include but may not be limited to one or more of a CD-ROM, DVD, memory, hard disk, flash drive, RAM, ROM, cache and the like.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another. The elements described and depicted herein, including in flow charts and block diagrams throughout the figures, imply logical boundaries between the elements. However, according to software or hardware engineering practices, the depicted elements and the functions thereof may be implemented on machines through computer executable media having a processor operable to execute program instructions stored thereon as a monolithic software structure, as standalone software modules, or as modules that employ external routines, code, services, and so forth, or any combination of these, and all such implementations may be within the scope of the present disclosure. Furthermore, the elements depicted in the drawings or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code operable to be executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine operable to execute program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments are described herein, including the best mode known to the inventor for carrying out the invention. Variations of those preferred embodiments may become apparent to those of ordinary skill in the art upon reading the foregoing description. Skilled artisans will use such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for providing balances for an account accessed by an electronic card, the method comprising:
   accessing the account with an electronic card;
   reading the electronic card with a portable card balance reader, the portable card balance reader having dimensions suitable to fit in a pocket of a user, the portable card balance reader also comprising function keys allowing the user to enter commands to the portable card balance reader;
   recording a ledger balance of the account in a local memory of the card balance reader, wherein a ledger balance of the account is an amount of deposited funds of the user less any amount on hold by one or more creditors;
   recording an available funds balance of the account in the local memory of the card balance reader, wherein the available funds balance is an amount of deposited funds of the user less any amount withheld by a financial institution awaiting clearance;
   providing at least one display on the card balance reader for displaying at least one of the ledger balance and the available funds balance;
   calculating with the card balance reader a minimum balance by comparing the ledger balance and the available funds balance, and
   determining the minimum balance; and
   comparing the minimum balance with an amount of a desired expenditure.

2. The method of claim 1, further comprising recording a check register balance of the account in the local memory of the card balance reader, wherein the check register balance is an amount that would be in an account of the user if the user were recording each completed transaction without regard to holds or other temporary variances,
   wherein the step of providing comprises providing at least one display for displaying at least one of the ledger balance, the available funds balance and the check register balance, and wherein the step of calculating comprises calculating with the card balance reader a minimum balance by comparing the ledger balance, the available funds balance and the check register balance.

3. The method of claim 1, further comprising recording in the local memory a cushion amount for the account.

4. The method of claim 1 further comprising: recording in the local memory the cushion amount for the account; and determining the minimum balance by adding the cushion amount to the lowest balance.

5. The method of claim 4, further comprising sending a signal or displaying an alert if the desired expenditure is greater than the minimum balance.

6. The method of claim 1, further comprising summoning at least one help screen by pressing a button of the portable card balance reader.

7. The method of claim 1, wherein the step of reading is accomplished with the portable card balance reader not connected to an Internet or an external computer terminal.

8. A method for providing balances for an account accessed by a smart card, the method comprising:
   accessing the account at a financial institution with the smart card;
   reading the smart card with a portable card balance reader, the portable card balance reader having dimensions suitable to fit in a pocket of a user, the dimensions about the size of the smart card, the portable card balance reader also comprising function keys allowing the user to enter commands to the portable card balance reader;
   recording a check register balance of the account in a local memory of the portable card balance reader, wherein the check register balance is an amount that would be in an account of the user if the user were recording each completed transaction without regard to holds or other temporary variances;
   recording a ledger balance of the account in a local memory of the portable card balance reader, wherein a ledger balance of the account is an amount of deposited funds of the user less any amount on hold by one or more creditors;
   recording an available funds balance of the account in a local memory of the portable card balance reader, wherein the available funds balance is an amount of deposited funds of the user less any amount withheld by the financial institution awaiting clearance;
   providing at least one display on the portable card balance reader for displaying at least one of a cushion amount, the check register balance, the ledger balance and the available funds balance;
   calculating with the portable card balance reader a minimum balance by comparing the check register balance, the ledger balance and the available funds balance and determining the minimum balance;
   comparing the minimum balance with an amount of a desired expenditure, using the portable card balance reader; and
   displaying an alert if the desired expenditure is greater than the minimum balance.

9. The method of claim 8, further comprising allowing the portable card balance reader to access information on the electronic card by providing an access code to the portable card balance reader, wherein the portable card balance reader is not in communication with the financial institution.

10. A portable card balance reader for an account at a financial institution accessed by an electronic card, comprising:
    a housing;
    an interface for the electronic card mounted to the housing;
    a microprocessor operably connected to the interface and having at least one memory sufficient for storing data and a computer software program, the microprocessor suitable for manipulating data in the memory;
    a manual entry device for entering data into the at least one memory; and
    at least one display, the at least one display operably connected to the microprocessor and the at least one memory, the at least one display for displaying a cushion amount, a ledger balance, an available funds balance, and a check register balance,
    wherein the card balance reader is sized to fit in a pocket of a user and is operable to record the ledger balance, the available funds balance, and the check register balance, and to compare the ledger balance, the available funds balance and the check register balance, to determine a real-time, actual balance; and wherein the ledger balance of the account is an amount of deposited funds of the user less any amount on hold by one or more creditors, the available funds balance is an amount of the deposited funds of the user less any amount withheld by the financial institution awaiting clearance, and the check register balance is an amount that would be in an account of the user if the user were recording each completed transaction without regard to holds or other temporary variances.

11. The portable card balance reader of claim 10, wherein the interface for the electronic card comprises a contact pad, a magnetic strip reader or an RFID antenna.

12. The portable card balance reader of claim 10, further comprising at least one alarm operably connected to the computer, the at least one alarm selected from the group consisting of a red light, a flashing light and a speaker.

13. The portable card balance reader of claim 10, wherein the manual entry device comprises a key pad operably connected to the microprocessor and the memory.

14. The portable card balance reader of claim 10, further comprising an additional display operably connected to the microprocessor for displaying at least one of the cushion amount, the check register balance, the ledger balance and the available funds balance.

15. The portable card balance reader of claim 10, further comprising a date/time display operably connected to the microprocessor.

16. The portable card balance reader of claim 10, further comprising an interface suitable for an Internet or a computer.

17. A portable card balance reader for an account of a user at a financial institution accessed by an electronic card, comprising:
 a housing;
 an interface for the electronic card, wherein the portable card balance reader has no interface suitable for directly accessing an Internet or a computer;
 a microprocessor operably connected to the interface and having at least one memory sufficient for storing data and a computer software program, the processor suitable for manipulating data in the memory;
 a key pad for entering data into the at least one memory; and
 at least one numeric display operably connected to the microprocessor and the at least one memory for displaying a cushion amount, a check register balance, a ledger balance and an available funds balance,
 wherein the portable card balance reader is sized to fit in a pocket of the user and has length and width dimensions about the size of the electronic card,
 wherein the ledger balance of the account is an amount of deposited funds of the user less any amount on hold by one or more creditors, the available funds balance is an amount of deposited funds of the user less any amount withheld by the financial institution awaiting clearance, and the check register balance is an amount that would be in the account of the user if the user were recording each completed transaction without regard to holds or other temporary variances,
 wherein the card balance reader is operable to record the check register balance, the ledger balance and the available funds balance, to compare the check register balance, the ledger balance and the available funds balance, to determine a minimum balance comprising the lowest balance of the check register balance, the ledger balance and the available funds balance, and to display an alert if an amount of a contemplated purchase exceeds the minimum balance.

18. The portable card balance reader of claim 17, wherein the at least one numeric display comprises three numeric displays.

19. The portable card balance reader of claim 17, further comprising a calculator and a calculator screen operably connected to the microprocessor and the key pad.

20. The portable card balance reader of claim 17, wherein the portable card balance reader further comprises function keys allowing the user to enter commands to the portable card balance reader.

* * * * *